June 22, 1943.  A. V. HOSE  2,322,517
VALVE ASSEMBLY
Filed March 4, 1941  2 Sheets-Sheet 2
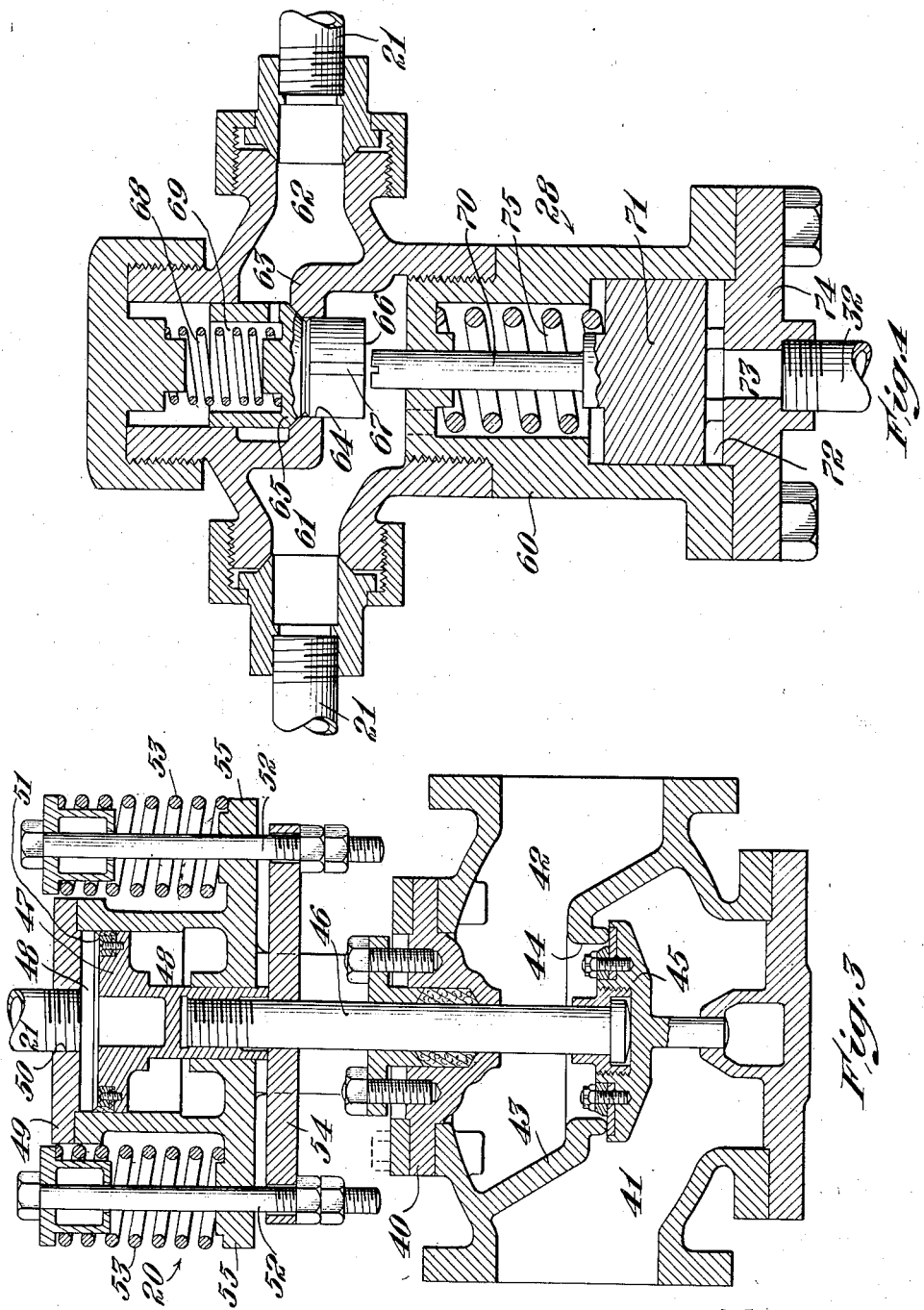
Inventor
Alexander V. Hose
by Roberts, Cushman & Woodberry
Att'ys.

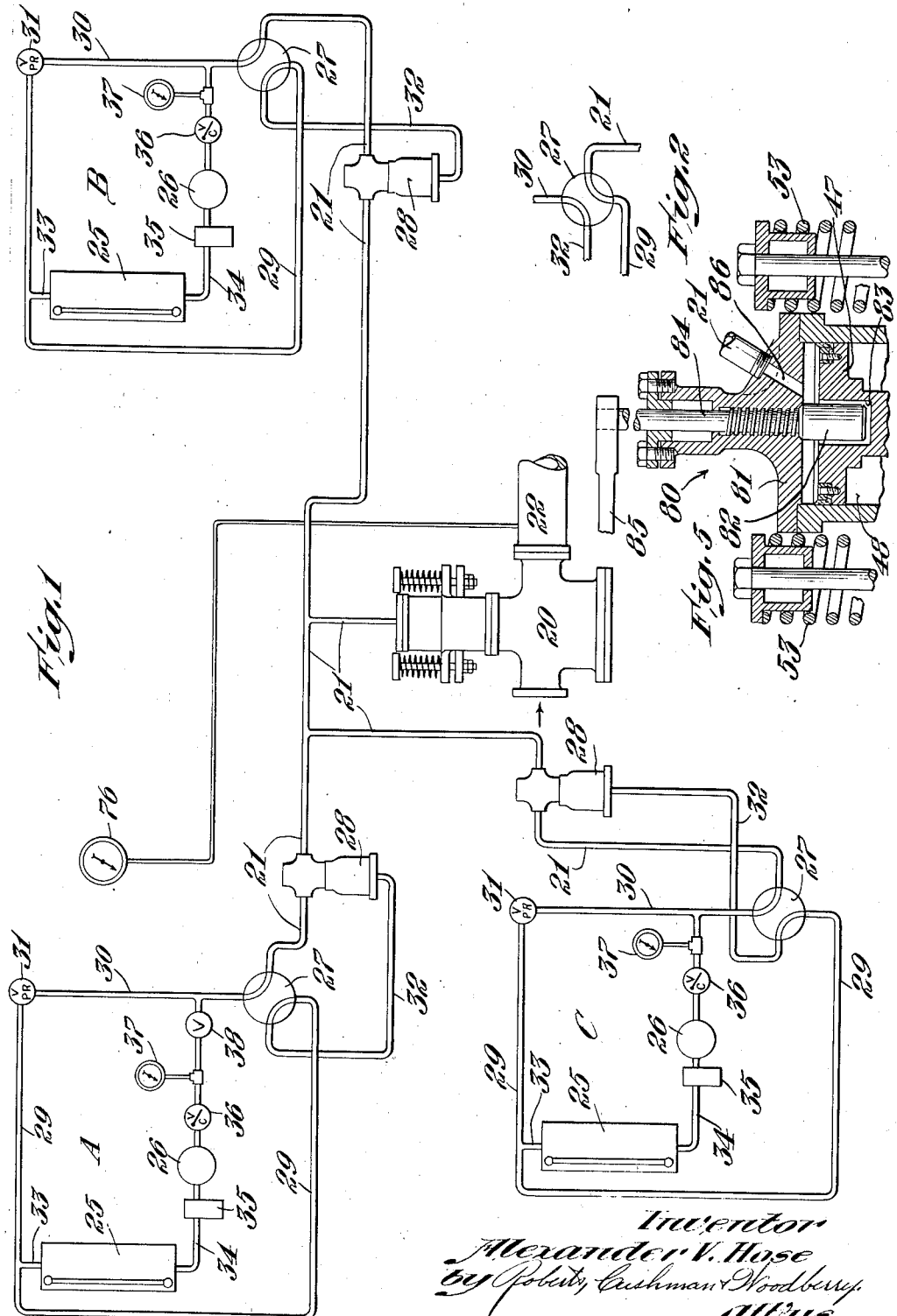

Patented June 22, 1943

2,322,517

UNITED STATES PATENT OFFICE 2,322,517

VALVE ASSEMBLY

Alexander V. Hose, Marblehead, Mass., assignor to Atwood & Morrill Co., Salem, Mass., a corporation of Massachusetts Application March 4, 1941, Serial No. 381,682

5 Claims. (Cl. 137—139)

This invention relates to an improvement in a valve assembly and more particularly in a control for a valve whereby such valve can be opened or closed independently at several stations.

It is the universal practice in ships having powder magazines to associate therewith flood valves which are normally closed and which, when opened, admit a flow of water, gas, or other fluid for the purpose of extinguishing a fire in the magazine or preventing ignition of the contents of the magazine. When employed in a ship of the United States Navy it is required that there be several control stations for the valve located in various parts of the ship so that the valve can be operated in any emergency as long as one station is accessible and in working condition.

This invention satisfies such requirements and will be described and shown as embodied in an installation by which the magazine flood valve can be so controlled. It will be understood, however, that the invention is not limited to such use but may be employed whenever it is desired to control the operation of a valve from a plurality of stations.

The primary object of this invention is to provide an installation comprising a valve, and a plurality of control stations for such valve, each said station including means by which said valve is opened and closed independently of the other stations.

A further object is to provide at each control station in such installation which includes a valve of the hydraulic type, a pump by which hydraulic pressure is applied to open said valve, a check valve to maintain such pressure and a four-way valve by which said pump is enabled to open said check valve and relieve the pressure upon the valve, and allow its closure.

These and other objects will appear from a consideration of the following description of the selected embodiment of this invention and of the accompanying drawings illustrating such embodiment, and in which Fig. 1 is a schematic plan view of an installation embodying this invention;

Fig. 2 is a similar view of a portion of said installation;

Figs. 3 and 4 illustrate in longitudinal cross section typical flood and check valves suitable for use in such installation; and Fig. 5 is a view similar to Fig. 3 of the top of a modified flood valve.

The installation illustrated in the drawings comprises a magazine flood valve 20 and three stations A, B and C, at each of which stations the valve 20 can be opened and closed. The valve 20 is of the hydraulic operated type and is normally closed. A pipe line 21 through which oil or other fluid pressure means travels connects each station independently with the valve 20 and as will appear hereinbelow, permits the opening and closing the valve by instrumentalities operated at or associated with each control station. It will be understood that when the valve 20 is opened water or other fluid flows through a pipe 22 into the magazine (not shown) or to any other desired destination to extinguish a fire. While, when installed in a ship, the pipe 22 usually feeds water from the ocean, it will be understood that the invention is not limited thereto and that gas or other fire extinguishing fluid may be supplied to the pipe.

Each control station is equipped with a reservoir or tank 25 containing oil or other fluid, a pump 26 and a four-way valve 27 to one port of which the pipe 21 is connected. Installed in the pipe line 21 at any desired location between the four-way valve 27 and the flood valve 20 is a check valve 28 which is normally closed. Pipe lines 29, 30 lead from two other ports of the four-way valve 27 to a relief valve 31. A pipe 32 connects the fourth port of the four-way valve 27 with the check valve 28. A branch pipe 33 leads from the line 29 to one end of the reservoir 25. Oil drawn from the tank 25 through a pipe 34 by the pump 26 is fed to the pipe 30 and thence through the four-way valve 27 to the pipe line 21.

Each station is also equipped on the pipe 34 with a filter 35 between the reservoir 25 and the pump 26, and a check valve 36 and gauge 37 between the pump 26 and pipe line 30. One station, that at the upper left-hand corner in Fig. 1, is also equipped on the pipe 34 with a hand valve 38.

The four-way valve 27 may be of any suitable type and is here shown diagrammatically. The flood valve 20 and check valve 28 may also be of any desired construction, as for example those valves shown in Figs. 3 and 4 which have been found to operate satisfactorily. It will be understood, however, that the invention is not limited to the employment of such particular valves.

The flood valve 20 (Fig. 3) comprises a housing 40 having an inlet passage 41 and an outlet passage 42 separated by a partition 43 having a port 44 therein adapted to be closed by a valve head 45. The head 45 is mounted at the lower end of a stem 46. At the upper end of the stem 46 is mounted a plunger 47 reciprocable in a chamber 48 at the upper end of the housing 40. The chamber 48 is open at the bottom and closed at the top by a plate 49 having a central opening 50 therein to which the pipe line 21 leads. The plunger 47 is equipped with a ring 51 which seals the space between the plunger and the wall of the chamber. The stem 46 is normally held in the position shown in Fig. 3, with the valve closed, by bolts 52 and springs 53 which act on a crossbar or plate 54 carried by the stem 46 and ears 55 of the valve housing 40. Obviously oil entering the chamber 48 under pressure from the pipe line 21 depresses the plunger 47 against the urge of the springs 54 and opens the valve.

The check valve 28 shown in Fig. 4 comprises a housing 60 having an inlet passage 61 and an outlet passage 62 separated by a partition 63 having a port 64 therein normally closed by a valve head 65. The valve head 65 includes a stem 66 which is provided with guiding fins 67 and which extends through the port 64 and a spring 68 seated in a pocket 69 and bearing against the top of the housing. Mounted in the housing below the valve head 65 is a post 70 carrying at its lower end a plunger 71 adapted to reciprocate in a chamber 72. The chamber 72 is connected through an opening 73 in the bottom wall 74 to one end of the pipe 32. A spring 75 normally acts to depress the plunger 71 in the chamber 72 as shown in Fig. 4 and thus holds the post 70 out of contact with the stem 66. Oil or other fluid entering the inlet passage 61 will raise the valve head 65 and allow the oil to pass into the outlet passage 62. The valve head 65 will close as soon as the flow stops to prevent any flow of the oil or other fluid in the opposite direction, and to retain it under pressure in the chamber 48.

The installation is normally in the condition shown in Fig. 1 with the flood valve 20 closed and the four-way valves 27 set to connect the pipe line 21 with the pipes 29 and 30 and the pipe 29 with the pipe 32. When conditions arise requiring the opening of the valve 20 the pump 26 at any one of the control stations is set into operation to draw fluid from the reservoir 25 and force it through pipes 34 and 30 and the pipe line 21 into the chamber 48 of the valve 20. As the pressure is built up the plunger 47 is forced downwardly and the valve opened. The fluid traveling along the line 21 passes through a check valve 28 and is trapped by such valve so that the pressure in the chamber 48 is maintained and the valve 20 held open. The gauge 76 indicates that the valve 20 is open and the pressure at which the water is flowing into the magazine. When the valve 20 is to be closed the four-way valve 27 at any control station is turned so that the pipe line 21 is connected to the pipe 29 and the pipe 30 is connected to the pipe 32. Operation of the pump 26 sets up a flow of fluid through the pipes 34, 30 and pipe 32 into the chamber 72 of the check valve 28 building up pressure therein and causing the post 70 to contact with the stem 66 and raise the valve head 65. Pressure on the fluid in the line 21 is thus released and the springs 53 act to close the valve and raise the plunger 47 forcing the excess fluid in chamber 48 to flow through the check valve 28, four-way valve 27 and pipes 29 and 33 into the reservoir 25. As soon as the valve 20 is closed the four-way valve 27 is restored to its normal position and the spring 75 of the check valve 28 lowers the post 70 and permits closure of the valve by the spring 68. The excess fluid in the chamber 72 is returned to the reservoir 25 through the pipes 32, 29 and 33.

The primary function of the check valves 28 is to maintain pressure in the flood valve. Obviously any destruction or damage to the mechanism at the control station or between it and a check valve would not affect a check valve already set to maintain such pressure. On the other hand, destruction or damage to the system between the flood valve and the check valves would, of course, render the system inoperative so that the flood valve would be closed and could not be opened.

In order to avoid this possibility the flood valve might be provided with a jack screw or other mechanism for hand operation, as shown in Fig. 5. The flood valve 80 there shown differs from the flood valve 20 solely in the structure substituted for the plate 49. In other respects the valves are identical and the same reference numerals are applied to the elements shown in Fig. 5 which are common to both valves. The chamber 48 is closed by a cap 81 in which is supported a plunger 82 that enters the central pocket 83 in the plunger 47. The plunger 82 includes a stem 84 which projects from the top of the cap 81. The stem 84 adjacent the head of the plunger 82 is externally threaded in engagement with the wall of the cap 81 and to its outer end is secured a crank bar 85. The pipe 21 supplies the fluid pressure for the normal opening of the valve through a passage 86. The flood valve 80 can be opened manually by rotating the plunger 82 to advance it and thus depress the plunger 47.

The essence of this invention is the provision with a valve of a plurality of control stations at each of which the valve can be opened and at each of which the valve can be closed. While one installation is herein described and shown in the drawings it will be understood that selected installation is merely illustrative and represents only one embodiment of the invention and that other embodiments thereof can be employed to carry out the invention within the spirit and scope thereof as set forth in the following claims.

I claim:

1. An installation comprising a normally closed main valve of the hydraulic type, a plurality of control stations, a pipe line connecting said valve directly with each of said stations and means at each station by which fluid pressure is transmitted through said pipe line to open said valve, said means including a fluid reservoir, a pump for drawing fluid from said reservoir and supplying it under pressure to said pipe line, a check valve by which the pressure supplied to the line is maintained so as to hold said main valve open, and pressure operated means associated with said pump for effecting the release of the pressure applied to open said main valve so as to permit said main valve to close.

2. An installation comprising a normally closed main valve of the hydraulic type, a plurality of control stations, a pipe line connecting said valve with said stations, means at each station by which fluid pressure is transmitted through said pipe line to open said valve, such means including a pump by which fluid is supplied under pressure to said pipe line, a four-way valve through which when in normal position the fluid passes to said line, a normally closed check valve in said pipe line through which the fluid under pressure passes and by which flow of the fluid in the opposite direction is prevented to hold said valve open and a pipe connecting said four-way valve and said check valve through which when said four-way valve is shifted from its normal position, fluid is supplied under pressure by said pump to open said check valve and permit the fluid under pressure to escape whereupon the main valve closes.

3. In a valve assembly a normally closed main valve of the hydraulic type, a pipe line leading thereto, a pump by which fluid pressure is applied through said pipe line to open said valve, a four-way valve and a check valve between said pump and said valve, said check valve being normally closed to maintain the fluid under valve opening pressure at said main valve, pressure operated means associated with said pump for effecting the release of the pressure applied to said pipe line and a pipe leading from said four-way valve to said check valve, said four-way valve in one position acting to transmit the fluid under pressure from said pump to said pipe line, and and in another position acting to transmit such fluid to said pressure operated means so that the fluid under pressure at said main valve is released and the main valve returns to its normal closed position.

4. An installation comprising a main valve, a plurality of control stations at each of which said valve can be opened or closed independently, a pipe line connecting said valve directly with each of said stations and means at each station by which fluid pressure is established and maintained in said line to open and hold open said valve and by which such pressure is broken and the valve allowed to close, such means including a fluid reservoir, a pump by which fluid is drawn from and returned to said reservoir a four-way valve by which such movement of the fluid by the pump is regulated, a check valve normally closed to maintain pressure in the pipe line, pressure operated means associated with said four-way valve for effecting the release of pressure applied to said main valve when the fluid is returned to the reservoir by the pump.

5. An installation comprising a main valve, a plurality of control stations at each of which said valve can be opened or closed independently, a pipe line connecting said valve directly with each of said stations and means at each station by which fluid pressure is established and maintained in said line to open and hold open said valve and by which such pressure is broken and the valve allowed to close, such means including a fluid reservoir, a pump by which fluid is drawn from and returned to said reservoir, a four-way valve by which such movement of the fluid by the pump is regulated, a check valve in said pipe line normally closed to maintain pressure in the pipe line, pressure operated means for opening said check valve, a pipe connecting said four-way valve with said pressure operated means, and a pipe connecting said four-way valve with said check valve independently of said pipe line whereby when the four-way valve is set so that the fluid is returned to the reservoir by the pump, said pressure operated means is connected with said pump so that the check valve is positively opened to break the pressure in the pipe line and allow the main valve to close.

ALEXANDER V. HOSE.